Printed Specification Available
9767X
Sheet 1 - 2 Sheets.
W. P. Brayton,
Spinning Machine,
Drawing 1st Fig. 2 Patented June 25, 1836
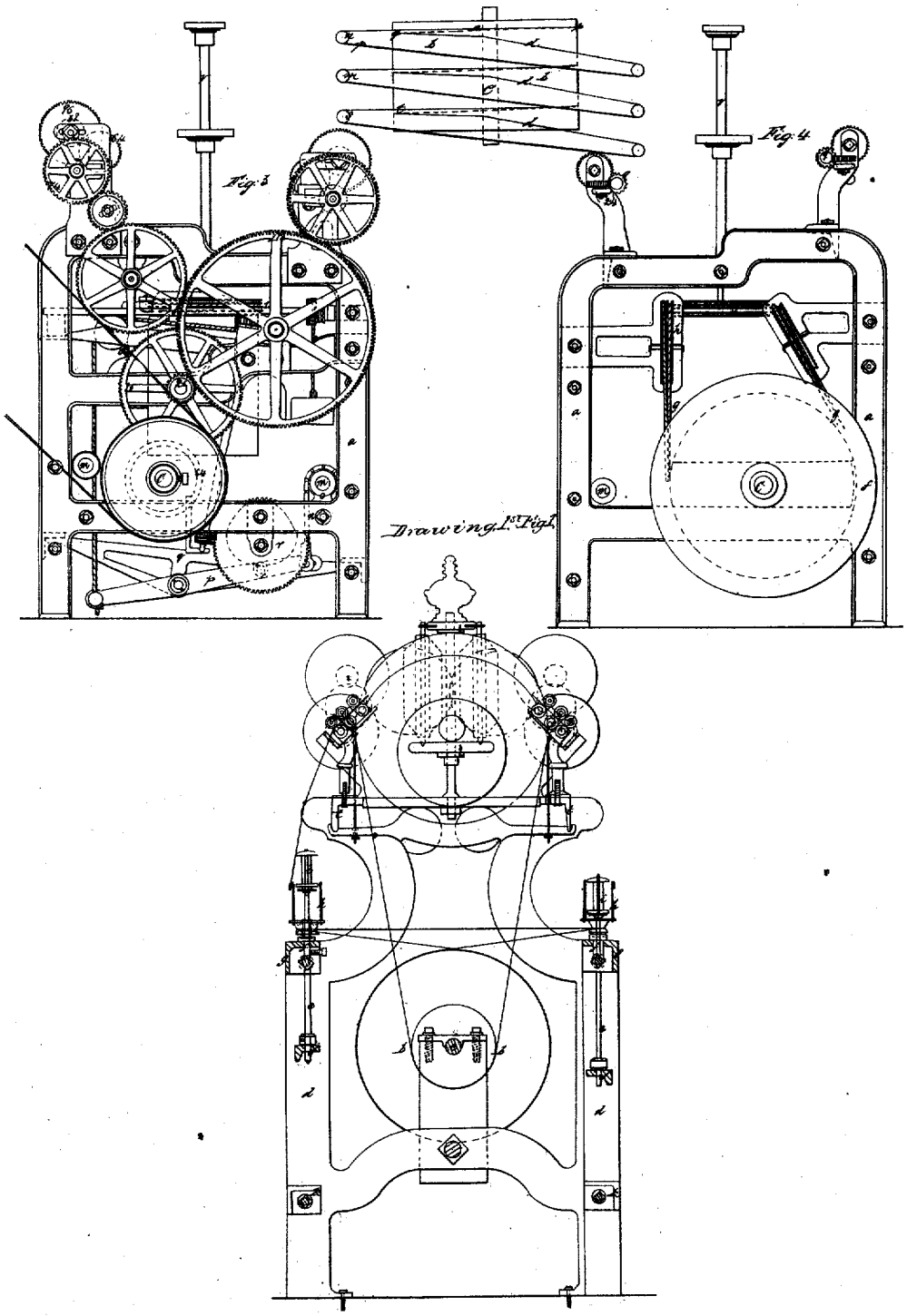
N. PETERS, PHOTO-LITHOGRAPHER, WASHINGTON, D. C.

9767X

Sheet 2-2 Sheets.

W. P. Brayton,

Spinning Machine,

Drawing 2nd Patented June 25, 1836

N. PETERS, PHOTO-LITHOGRAPHER, WASHINGTON, D. C.

9767X June 25. 1836

William P. Brayton New York

Letters Patent.

The Schedule referred to in these Letters Patent, and making part of the same, containing a description in the words of the said Wm P. Brayton, of his Improvement in the Machine for Spinning and Doubling Cotton.

Figure 1:
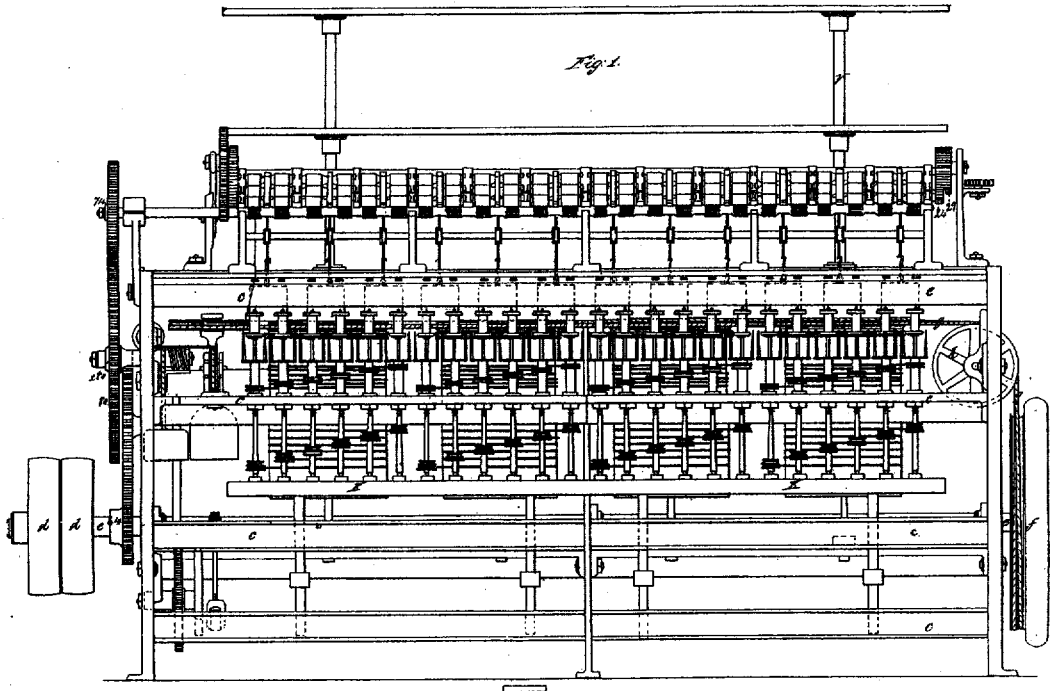
Figure 2:
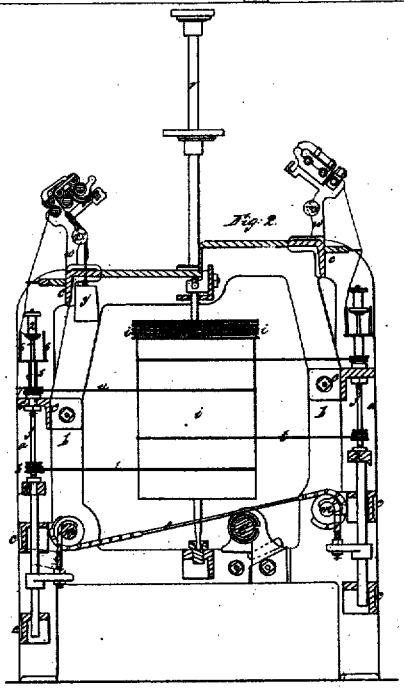

To all to whom these presents shall come. Be it known that I Wm P. Brayton of the City, County and State of New York Engineer, have invented a new and useful improvement in machinery for spinning and Doubling cotton silk and other fibrous materials or substances, and which are applicable to various useful purposes, and that the following is a full and exact description of the construction and operation of the said improvement as invented by me, reference being had to the drawings hereto annexed and making part of this specification. For the more clearly illustrating these improvements, I have hereunto appended several drawings exhibiting the complete Throstle frame in different positions, with the situation of the upright driving drums and of the bobbins and flyers, and the manner in which they are actuated; and also a new mode of driving flyers and spindles with a line or horizontal cylinder where but one motion is required from the driving drum to the spindles or flyers in consequence of a peculiar way of constructing the Machine and of putting on the bands as will be shown in drawing first figures 1 and 2. Drawing 1st Fig 1 in this figure I show an end view of a Throstle frame for spinning, with a line or horizontal cylinder for driving spindles and flyers. I show an end view view of the cylinder and a view of the bands and also two
spindles driven by the same which construction of spindles
I claim as new and of my own invention.
A. A. is the Throstle frame b.b. the cylinder, c. the shaft of
the cylinder. d is an endless band that drives two spindles
e. e. are the spindles, f. f. are studs that give steadiness to the
spindles, g. g. are stationary rails which the studs f. f. are screwed
fast to, h. h. are flyers which are screwed onto the top of the
spindles to give twist to the thread as it comes from the draw
ing rollers in the usual way. i. i. are the bobbins that receive
the thread from the flyers, j. j. are the lifting rails which
cause the bobbins to rise and fall for the distribution of
the thread upon the bobbins K. K. are stationary rails for
holding the machine together and also receive the footsteps
of the spindles: L. L. are also stationary rails for holding
the machine together. Fig 2. In this figure I show a top view
of the cylinder and the whirls of the spindles, and also
a view of the bands as they will appear when running. Some
of the spindles are left unbanded that it may be the better
seen how the bands appear on those that are banded.
The letters b.b. denoting the cylinder, C. the shaft, and d. an
endless band as in Fig 1. M. M. are the two first spindles
upon that end of the machine. In order to band spindle
M. upon the right, I place a friction pulley N. on the left and
carry the ~~the~~ band round it and over the top of the drum
at O. and down at f round the under side of the drum as
shown in broken lines and up at g and over the top of the
drum again, and round the spindle at M. and then I
carry it over the top of the drum again to the friction pulley
and tied to the other end of the band at [illegible] at the hither
end of the machine I put the band round the whirl of the
spindle at [illegible] and over the top of the drum at [illegible] round
under the bottom of the drum and up at [illegible] and over
the 1176 [illegible]

the top of of the drum again and around a friction pulley
at 10 and back to 5 and tied. These friction Pulleys being
placed the space of one spindle to the right or left for the
purpose of banding the first or last spindle by. a less distance
would perhaps answer; and the spindles might be so placed
in the machine as to need no friction pulleys but this I
conceive to be the best way. It will be perceived that in
banding spindles 4 & 10 that they vary one space from
being directly opposite to each other, this is to prevent the
bands from running together over the top of the drum or
wearing off. A less than a full space of spindle might
answer, but much depends on the width of the machine
and the distance the spindles are set apart. variation
enough should be made so that the bands will not run
together over the top of the drum. In this way throstle
frames may be made two feet wide and have cylinders
in them fourteen or sixteen inches in diameter.

The top of the cylinder in a machine two feet wide [illegible]
should be set about one and a half inches below the
whirls on the spindles. In drawing 2nd Figure 2 The
spindle j is represented with a disc 1 upon it which fit
fast upon the spindle and carries the bobbin 2.
This spindle is made to revolve by a band from the dri-
ving drum passed round the whirl 3. upon the spindle
A tube 4 is affixed by its socket and screw nut to the
upper stationary rail c-c. the upper part being bushd
to give steadiness with little friction to the spindle
which revolves within it and is caused to slide up
and down by the movement of the capping rail.
On the outside of the tube 4 another tube 5 is fitted
carrying the flyers 6-6 and which last mentioned tube
with the flyers are made to revolve by a band from
the driving drum passed round the whirl 7 hence
it it will be perceived that the bobbins and the flyers may
be made to revolve by one driving drum at dissimilar
speeds according to the different diameters of the whirls
and in this instance the spindles should run so much
faster than the flier as to cause the bobbin to lead the flier to
take the yarn up and just keep the thread straight as it is
delivered from the drawing rollers. By driving the flyers
with a speed nearly equal to that of the spindles and
bobbins the drag will be tempered and yarn of very high
numbers may be readily spun and wound upon the
bobbins. Drawing 3rd Fig 1 is a front elevation of a throstle
frame constructed on an improved plan with a series
of bobbins and flyers driven by upright drums or cylin
=ders. Fig 2 is a transverse section of the same shewing
the manner in which the driving bands pass from the
upright drums to the whirls of the spindles and flyers.
Fig 3 is an elevation of the throstle frame taken at that
end where the driving pulleys or riggers is affixed.
Fig 4 is an elevation of the reverse end of the throstle frame
showing the bands and pulleys by which the upright
drums are driven; the similar letters of reference point=
ing out the same parts in the four last mentioned
figures. The end frames or standards of the throstle
are shown at a. a. Fig 2. and b.b. is the middle frame
c c, cc, cc. are the longitudinal stationary rails by which
the end and middle frames are braced together and the
principle parts of the machine supported d.d. Fig 1. are
the fast and loose pulleys or riggers over which a strap
is passed from the first moving power to drive the
machinery. e is the main shaft or axle communicating
motion to the working parts of the machine and f
is a fly wheel and pulley affixed to the end of the main
driving shaft round which pulley an endless band 959 9767X band g.g. passes over diagonal guide pulleys h.h. and round the grooves at the upper part of the upright drums l.l. for the purpose of giving rotary motion to the driving drums. These drums l l turn upon vertical axels bearing in t.t. are passed round the respective whirls of the spindles j.j. and round the drums l l and similar bands ll. ll. are passed round the respective whirls of the flyers and also round the drums by which means when the drums are set in motion, and made to revolve by the means before described. The spindles and flyers will be driven and as the spindles ascend and descend their driving bands move up and down upon the periphery of the driving drums, always presenting the same altitude as the whirls and thereby keeping the bands at all times at the same strain or tension. One side of the Machine is made higher than the other in order that the bands of the spindles upon one side of the Machine shall all pass round the drums above the bands of the spindles upon the other side of the Machine and not interfere with each other and the same is to be observed in respect to the bands which carry the flyers as shown in Fig 2 which constitutes a part of this invention.

The cotton or other materials to be spun to be placed on the top of the Machine in the usual manner, and l.l. are stands to support them. W.W. in Fig 2 are drawing roller stands which being so constructed as to allow a rod to be placed longitudinally in the back side of the stand at x.x. in order that the weight that causes the top drawing rollers to press upon the bottom ones may pull square to the center of the bottom drawing rollers and that the rollers may be elevated or turned up so as to allow the twist of the thread or yarn to run up imme diately into the jaws of the rollers, that the article to to be spun may receive the twist as soon as the drawing
rollers leave it, which is found to be extremely necessary
when spindles are run at very high speed and more
particularly in the spinning of fine yarns. The wire
that is attached to the weight Y. Fig [illegible] and the wire in
which is steps in a longitudinal rail, or step rails may be
substituted and supported at each end by the bottom longi-
tudinal stationary rails and in this case the drums may
be driven by mitre or bevil wheels, for which in slower
motions for spinning rovings in the Jack or bobbin & fly
frames for which this principle of driving is also claimed
Bevil driving would perhapse be most suitable, and the
spindles or shafts of the drums are confined in collars,
in a longitudinal rail at the top as shown in Fig 8 - the spin-
dles f.f. are arranged in series on each side of the frame
supported in steps at the bottom by the copping rail K.K.
and passed through tubes and sockets in the upper station-
ary longitudinal rail C.C. The bobbin being upon a disc
mounted upon the upper part of the spindle and turning
therewith. The flyers are attached to a tube as before de-
scribed with a whirl affixed to the flyer tube. the copping
rails K.K. supporting the spindles are made to rise & fall
for the purpose of winding the yarn in uniform coils on
upon the bobbins by the ordinary contrivances, That is
to say by connecting these rails to pendant chains l.l.
attached to longitudinal shafts m-m- which reach the
whole length of the Machine. — Another chain n. Fig 3 is
attached to a pulley O- on shaft M and made fast at the
lower end to the lever p- which lever is mounted on a
stud set in a transverse carrier rail q and is made to
vibrate by the rotation of the heart wheel r- a cord
and ballance weight being attached to the reversed end
of the lever. These two lifting rods m.m- Fig 3, are connected
by

9767X by a chain S transversely, as shown in Fig 9, and the spindles are lifted upon both sides of the machine at the same time, with the same power that would be required to lift one side providing the weight attached to the lever are sufficiently heavy. In order to drive the spindles and flyers bands attached to the saddle of the top drawing rollers are connected by a cord or string and bearing over the rod x or a small pulley upon the bed Z Z are guide wires between the back and middle drawing rollers attached to the traversing rod for the purpose of keeping double rovings together and never cause them to break, which is a great convenience in spinning fine yarns both in the Throstle and the mule. These guide wires and the above mentioned [illegible] w-w- also constitute a part of this invention. This Throstle is peculiarly adapted to the spinning of fine yarns.
By running the spindles to carry the bobbins, the drag is taken off of the thread as it comes from the flyers which puts it in the twist and very high numbers may be spun. The spindle running within the bobbin, and the disc which the bobbin rests upon being fast to the spindle and revolving therewith a live surface is produced under the bottom of the bobbin and also inside of the bobbin, so that the drag upon the thread may be so nicely tempered that a yarn of two hundred hanks to the pound may be readily spun.

By placing the whirls of six spindles and six flyers which constitute a set to be run upon one side of a drum at different heights the bands will run clear of each other as shown in Fig 6. In drawing 1st I am enabled to put a 14 or 16 inch cylinder into a Throstle frame that is only two feet wide, whereas Throstle frames are now made four feet wide, to receive a cylinder only seven inches inches in diameter, which cylinder must run twice as fast as mine to give the same speed to the spindles and at the same time is not able to stand as high speed as a larger cylinder, and by having a small cylinder, the whirls on the spindles are often made small in order to get the necessary speed, which is very destructive to the spindles by being obliged to have the bands much tighter, by having a large cylinder, I am enabled to have the whirls on the spindles larger and consequently enabled to run spindles with a slackened band, and again by putting the band all around the cylinder, it gives the cylinder more power upon the band and the band will bear to be slacker on that account and the slacker the band is run the better it will last, and the longer the spindles will last, and again the bands in this way run straight upon one side of the whirls of the spindles and upon the other side, have an angle of only an inch and a half to the foot.

What I claim as my invention is the method of banding and driving the spindles substantially as is described in the above specification and referred to in drawing 1st Fig 1 & 2 thereby saving one half of the room in the width of the Throstle frame, and being enabled to use a large cylinder instead of a small one which is in all cases desireable; I also claim the spindle substantially as described above and referred to in Fig 1st drawing 1st. I also claim the peculiar construction of the parts of a Throstle frame for spinning and or doubling substantially as is described above and refered to in Drawing 2nd.

I also claim the adaptation of upright drums or cylinders for driving the spindles and the flyers by distinct bands in a Throstle frame substantially as as is above described and also the peculiar modes
of mounting and drawing the bobbins and the flyers
in a Throstle frame for the purpose of causing them
to revolve with distinct and dissimilar speeds
substantially as is described above, and I also
claim the stand uu and the guide wires ZZ sub-
stantially as is above described.

Witnesses
A. S. Hamilton }
John Johnson }

Wm Brayton 31.17 [illegible] (Patented 25 June 1838) Exd. [illegible]

Drawing